United States Patent
Chen et al.

(10) Patent No.: US 11,688,178 B1
(45) Date of Patent: Jun. 27, 2023

(54) SYSTEM AND METHOD FOR CALCULATING REGIONAL CROWD MOVEMENT

(71) Applicants: China Construction First Group Corporation Limited, Beijing (CN); China Construction First group Huabei Construction Co., Ltd., Tianjin (CN); Lanjian (Suzhou) Technology Co., Ltd, Jiangsu (CN)

(72) Inventors: Lei Chen, Beijing (CN); Wei Xu, Tianjin (CN); Zhiyu Zhao, Tianjin (CN); Ruoxuan Mei, Jiangsu (CN); Weiyu Su, Jiangsu (CN); Ziqi Zhou, Beijing (CN); Zhengang Zhao, Jiangsu (CN); Yuze Wang, Tianjin (CN); Yanting He, Beijing (CN); Xiaojiao Xiao, Tianjin (CN); Guoxu Zhang, Tianjin (CN); Jing Tong, Tianjin (CN); Le Wang, Tianjin (CN); Ling Wang, Tianjin (CN); Zijin Liao, Jiangsu (CN)

(73) Assignees: China Construction First Group Corporation Limited, Beijing (CN); China Construction First group Huabei Construction Co., Ltd., Tianjin (CN); Lanjian (Suzhou) Technology Co., Ltd, Suzhou (CN)

( * ) Notice: Subject to any disclaimer, the term of this patent is extended or adjusted under 35 U.S.C. 154(b) by 0 days.

(21) Appl. No.: 17/947,901

(22) Filed: Sep. 19, 2022

(30) Foreign Application Priority Data

Aug. 16, 2022 (CN) .......................... 202210978500.7

(51) Int. Cl.
*G06V 20/58* (2022.01)
*G06K 7/10* (2006.01)
(Continued)

(52) U.S. Cl.
CPC ......... *G06V 20/58* (2022.01); *G06K 7/10475* (2013.01); *G06K 19/0724* (2013.01);
(Continued)

(58) Field of Classification Search
CPC ............... G06V 20/58; G06K 7/10475; G06K 19/0724; G06K 19/07773; G06K 2019/06253; G06N 3/04; G06N 3/08
See application file for complete search history.

(56) References Cited

U.S. PATENT DOCUMENTS

2018/0314985 A1* 11/2018 O'Shea .................. G06N 20/00
2020/0064444 A1* 2/2020 Regani ..................... G01S 7/417
(Continued)

*Primary Examiner* — Qun Shen

(57) ABSTRACT

The embodiments of the present disclosure provide a system for calculating a regional crowd movement and a method thereof. The system is applied to a target monitoring environment, a plurality of key travel nodes are planned in the target monitoring environment, and the system includes radio frequency labels deployed on pedestrians, calculation apparatuses deployed at the key travel nodes and a plurality of directional antennas. The directional antenna is configured to, when driven by the calculation apparatus, send a read-write signal to the radio frequency label in a coverage region; the directional antenna is further configured to forward a radio frequency signal simultaneously reflected by the radio frequency label at the time of obtaining the read-write signal to the calculation apparatus; the calculation apparatus is configured to, based on a tempo-spatial distribution circumstance of the radio frequency signals in the region.

20 Claims, 3 Drawing Sheets

(51) Int. Cl.
*G06K 19/077* (2006.01)
*G06N 3/04* (2023.01)
*G06N 3/08* (2023.01)
*G06K 19/07* (2006.01)
*G06K 19/06* (2006.01)

(52) U.S. Cl.
CPC ......... *G06K 19/07773* (2013.01); *G06N 3/04* (2013.01); *G06N 3/08* (2013.01); *G06K 2019/06253* (2013.01)

(56) References Cited

U.S. PATENT DOCUMENTS

| | | | |
|---|---|---|---|
| 2020/0265698 A1* | 8/2020 | Eckert | G01S 13/584 |
| 2020/0302187 A1* | 9/2020 | Wang | H04L 25/0204 |
| 2022/0327360 A1* | 10/2022 | Merlin | H04W 64/006 |

* cited by examiner

SYSTEM AND METHOD FOR CALCULATING REGIONAL CROWD MOVEMENT

TECHNICAL FIELD

The present disclosure relates to the field of crowd locating technologies, and in particular to a system for calculating a regional crowd movement and a method thereof.

BACKGROUND

Along with rapid economic development, large-scale indoor spaces such as exhibition halls, gyms and amusement parks are increasingly used to host large events, leading to a high visitor flow rate and a large crowd density. With the complex internal structures of such spaces, without timely interference and traffic dispersion, major accidents may occur such as regional congestion, trampling etc. and are a large potential safety hazard. Therefore, a space management party needs to quickly and accurately perceive distribution and movement circumstances of an internal crowd, so as to provide data support for operation management.

In order to overcome the aforementioned problems, many research institutes and enterprises now utilize crowd locating technologies. The current major crowd distribution locating solutions include an image recognition-based locating solution and a radio frequency signal-based locating solution. The image recognition-based locating solution captures images of each video monitor regularly and calculates the number or position data of people in a scenario by performing recognition for the images. The radio frequency signal-based locating solution mainly applies low power consumption wireless locating technologies such as Bluetooth® and ZigBee® to deploy a wireless base station at a predetermined position while requiring individuals of a crowd to carry wireless labels which periodically send out wireless signals, where when the wireless labels enter a predetermined space, the wireless base station may detect the signal and based on the signal, perform location tracking of the crowd while utilizing position information of the base station or other positional reference information.

However, the existing technical solutions have their own shortcomings. For example, due to limitations of the wireless signal broadcast period, base station scanning frequency, etc. a number of the signals scanned by a single base station at a single time is typically limited to 20 to 30 wireless labels per second; and when a crowd density is large, there may be a possibility of missing scans, leading to insufficient location tracking accuracy.

SUMMARY

Embodiments of the present disclosure aim to provide a system for calculating a regional crowd movement and a method thereof, so as to improve a crowd locating accuracy.

An embodiment of the present disclosure provides a system for calculating a regional crowd movement, which is applied to a target monitoring environment. A plurality of key travel nodes are planned in the target monitoring environment, and the system comprises radio frequency labels deployed on pedestrians, calculation apparatuses deployed at the key travel nodes and a plurality of directional antennas.

The directional antenna is configured to, when driven by the calculation apparatus, send a read-write signal to the radio frequency label in a coverage region.

The directional antenna is further configured to forward a radio frequency signal simultaneously reflected by the radio frequency label at the time of obtaining the read-write signal to the calculation apparatus.

The calculation apparatus is configured to, based on a tempo-spatial distribution circumstance of the radio frequency signals in the region, adaptively calculate a regional crowd movement trend using a trained deep learning model.

According to a second aspect of embodiments of the present disclosure, there is further provided a method of calculating a regional crowd movement, applied to the system according to any one of the above claims. The method includes:

when determining the directional antenna is driven by the calculation apparatus, triggering the directional antenna to send a read-write signal to a radio frequency label in a coverage region;

triggering the directional antenna to forward a radio frequency signal simultaneously reflected by the radio frequency label at the time of obtaining the read-write signal to the calculation apparatus;

triggering the calculation apparatus to, based on a tempo-spatial distribution circumstance of the radio frequency signals in the region, adaptively calculate a regional crowd movement trend using a trained deep learning model.

It can be known that, in the system for calculating a regional crowd movement and a method thereof provided by the embodiments of the present disclosure, the directional antenna reads the passive radio frequency labels such that a count accurately read in one second is not less than 200 pieces(PCS), thus effectively improving the data processing efficiency. In addition, without exposing user biological features and private information such as facial features, body pose, clothing etc., based on the tempo-spatial distribution circumstance of the radio frequency signals in the region, the regional crowd movement trend may be adaptively calculated using a trained deep learning model, thereby avoiding the calculation disaster of infinite exhaustion for environmental conditions. In a case of the advantages of high efficiency and low consumption, high recognition and estimation accuracy may be achieved at the same time.

Other features and advantages of the present disclosure will be elaborated in the subsequent specification and become apparent partially from the specification, or known by practicing the embodiments of the present disclosure. The object and other advantages of the present disclosure may be implemented and obtained by use of the specification, the claims and the structures specially pointed out in the drawings.

BRIEF DESCRIPTIONS OF THE DRAWINGS

In order to describe the technical solutions of the embodiments of the present disclosure more clearly, brief introduction will be made to the drawings required for descriptions of the embodiments of the present disclosure. It should be understood that the following drawings only show some embodiments of the present disclosure and thus shall not be considered as limiting to the present disclosure. Other relevant drawings may be obtained by those skilled in the art based on these drawings without making creative work.

DETAILED DESCRIPTIONS OF EMBODIMENTS

Figure 1:
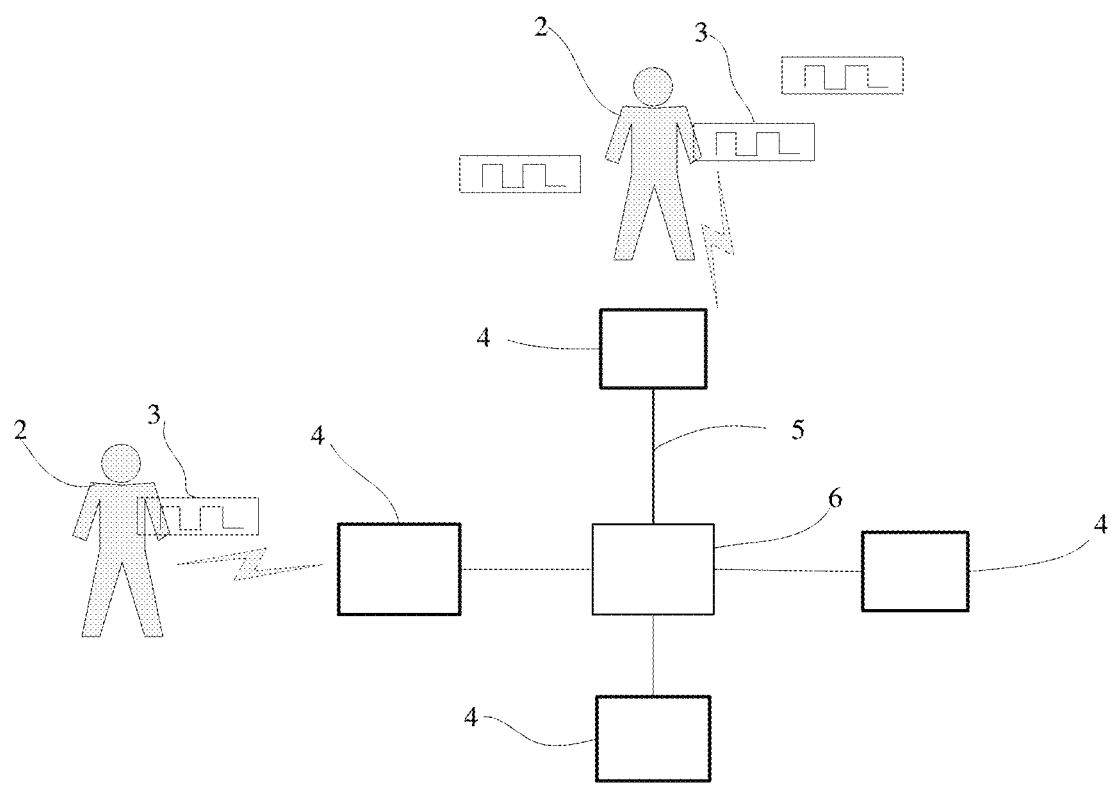
FIG. 1 is a schematic diagram of deployment of a system for calculating a regional crowd movement according to an embodiment of the present disclosure.

The technical solutions of the present disclosure will be clearly and fully described in combination with the drawings in the embodiments of the present disclosure. Apparently, the embodiments described herein are only some embodiments of the present disclosure rather than all embodiments. Usually, an assembly of the embodiments of the present disclosure described and shown in the drawings herein may be arranged and designed in different configurations. Therefore, the detailed descriptions for the embodiments of the present disclosure provided in the drawings are not intended to limit the scope of protection of the present disclosure but only indicate preferred embodiments of the present disclosure. All other embodiments obtained by those skilled in the art based on these embodiments without making creative work shall fall within the scope of protection of the present disclosure.

It should be noted that similar numerals and letters indicate similar items in the following drawings and thus once one item is defined in one drawing, such item will not be further defined and explained in the subsequent drawings. Further, in the descriptions of the present disclosure, the terms "first" and "second" are used only for distinguishing descriptions and shall not be understood as indicating or implying relative importance.

FIG. 1 is a schematic diagram illustrating deployment of a system for calculating a regional crowd movement according to one or more embodiments of the present disclosure. The system is applied to a target monitoring environment in which a plurality of key travel nodes are planned. The system includes radio frequency labels 3 deployed on pedestrians 2, calculation apparatuses 6 deployed at the key travel nodes, and a plurality of directional antennas 4.

The directional antenna 4 is configured to, when driven by the calculation apparatus 6, send a read-write signal to the radio frequency label 3 in a coverage region.

The directional antenna 4 is further configured to forward a radio frequency signal simultaneously reflected by the radio frequency label 3 at the time of obtaining the read-write signal to the calculation apparatus 6.

The calculation apparatus 6 is configured to, based on a tempo-spatial distribution circumstance of the radio frequency signals in the region, adaptively calculate a regional crowd movement trend using a trained deep learning model.

As shown, in the system for calculating a regional crowd movement provided by the present disclosure, the directional antenna reads the radio frequency labels such that a data volume accurately read in one second is not less than 200 PCS, thus effectively improving the data processing efficiency. In addition, the data is processed without exposing biological features and private information of members of the crowd, such as facial features, body pose, clothing etc. Based on the tempo-spatial distribution circumstances of the radio frequency signals in the region, a regional crowd movement trend may be adaptively calculated using a trained deep learning model, thereby avoiding calculation problems such as infinite exhaustion due to environmental conditions. Thus, the data may be processed with a high efficiency, low consumption of resources, and enhanced recognition and estimation accuracy simultaneously.

In an embodiment, the radio frequency label includes an ISO18000-6C electronic label and consists of a circuit having a unique code. The radio frequency label is further configured to, when obtaining the read-write signal transmitted by the directional antenna, reflect a radio frequency signal carrying circuit code information to the directional antenna such that the directional antenna forwards the radio frequency signal to the calculation apparatus.

Specifically, the radio frequency label may be a passive radio frequency label which consists of a circuit having a unique code. Each code represents a pedestrian and the label does not need a power apparatus for power supply. Thus, compared with an active radio frequency label which needs to be regularly powered by a battery, in the current embodiment, the passive radio frequency label does not require a battery source, has a lower production cost, and is convenient to operate.

In an embodiment, the calculation apparatus may be an edge computer. It is noted that, when a pedestrian a enters a region b covered by the directional antenna, under the read-write signal driven by the edge computer, the radio frequency label deployed on the pedestrian a may reflect a radio frequency signal containing code information of the radio frequency label to the directional antenna. The signal is fed together with a current time and a signal strength of the signal back to the edge computer in real time, such that the edge computer calculates a probability of a regional crowd movement based on the radio frequency signal and the signal strength of the radio frequency signal.

In the above embodiment, the directional antenna may accurately read 200 PCS or more in one second when reading the radio frequency signals, which may be completed in the edge computer, resulting in real-time tracking and less consumption of computing resources. Thus, the calculation efficiency is far higher than that of the image processing technical solution.

In one embodiment, with reference to FIG. 1, the directional antenna 4 is connected to the calculation apparatus 6 through a radio frequency cable 5.

The directional antenna includes a plate antenna with a power of 30 dbm and the radio frequency cable includes a standard cable with an impedance of 50 ohms.

As will be appreciated by one skilled in the art, the types of the directional antenna and the radio frequency cable are not limited to the aforementioned types and may be flexibly selected based on user requirements and surrounding environment in different embodiments. Thus, no limitation is made hereto in the current embodiment.

A number of the directional antennas matches a number of channels covered in the key travel node, where each channel covered by the node is provided with a directional antenna facing in a direction parallel to the channel.

Figure 2:
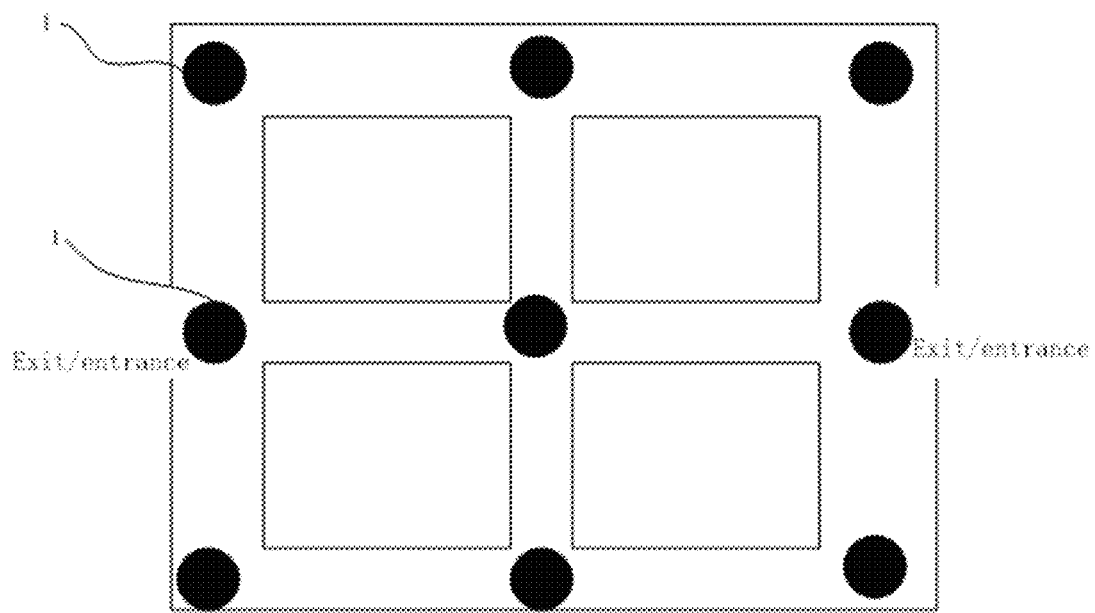
FIG. 2 is a schematic diagram of deployment of a key travel node in a target monitoring environment.

Specifically, as shown in FIG. 2, a key travel node 1 may be disposed respectively at the positions such as an entrance/exit, a crossing, T-junction, or the like of reserved channels, and a corner. Illustratively, for a crossing or T-junction, four directional antennas may be disposed. For a corner, two directional antennas may be disposed. Each channel is provided with one antenna facing in the direction parallel to the channel, so as to ensure a full regional coverage.

In an embodiment, the antennas may be fixed on the top of a building by top mounting method and/or, fixed on the ground by column mounting method.

In the above embodiment, for different scenarios, the number of antennas may be flexibly configured, leading to flexible deployment and convenient maintenance.

In an embodiment, the calculation apparatus is further configured to obtain regional crowd movement data fed back by a first calculation apparatus of an adjacent node to which the calculation apparatus belongs, and based on the crowd movement data, determine crowd flow information covered in a node-connected channel during a preset time period, wherein the crowd flow information includes person flow rate information and label identification information.

Specifically, for an adjacent node A2 of a region A1 to which it belongs, the calculation apparatus obtains person flow rate information and an identified label list in the node-connected channel within a time period [t, t+T] based on the crowd movement data of the region A1 recorded by the adjacent node A2. Next, the data is used as one sample value of a training set, and each node trains a neural network of the present node using feedback values (crowd flow information) of adjacent nodes of various directions, where the training action is set based on two conditions: period and accuracy.

The calculation apparatus is further configured to use the obtained radio frequency signal and a signal strength of the obtained radio frequency signal as first input data of the deep learning model and obtain a movement probability of movement of a pedestrian between different coverage regions by processing the first input data using the deep learning model.

The calculation apparatus is further configured to use the crowd flow information as second input data of the deep learning model, and based on the crowd flow information, perform deviation correction for the movement probability to determine the regional crowd movement trend based on an obtained correction result.

In the above embodiment, without exposing user biological features and private information such as facial features, body pose, clothing etc., a movement and a trajectory of a specific pedestrian may be accurately calculated using the deep learning model. The model supports adaptive learning for different environments and numbers of people, and may perform automatic learning along with change of scenario while still accurately tracking during difficult situations such as human body blocking, resulting in high robustness and improving crowd location tracking accuracy.

In an embodiment, the deep learning model includes an input layer for obtaining the input data, an intermediate layer for performing nonlinear mapping for the input data, a sequence layer for performing time accumulation updating and nonlinear mapping, a fully-connected layer, and an output layer.

Figure 3:
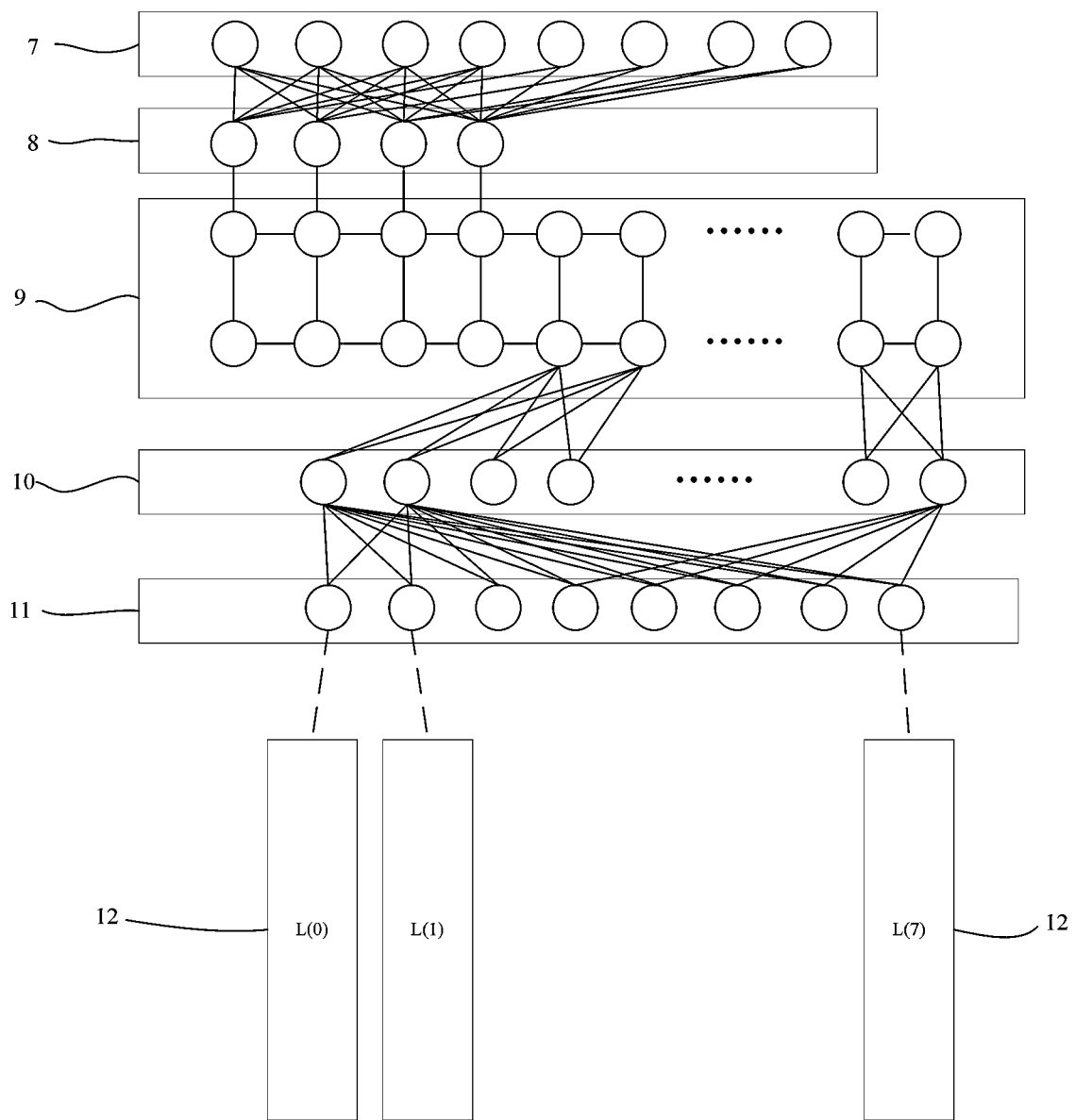
FIG. 3 is a structural schematic diagram illustrating a deep learning model.

Specifically, as shown in FIG. 3, the entire deep learning model consists of multiple layers of neural networks. With four directional antennas as example, the model includes the following layers:

(1) an input layer 7 containing 8 neurons, with a corresponding input sequence being [D(0), D(1), D(2), D(3), rssi(0), rssi(1), rssi(2), rssi(3)];

where D(i) represents whether the directional antenna i receives the radio frequency signal, and is valued at 1 or 0, and rssi(i) represents the signal strengths of the radio frequency signals received by the directional antenna i. Illustratively, D(0) indicates whether or not a first directional antenna of the plurality of directional antennas received the radio frequency signal, D(1) indicates whether or not a second directional antenna of the plurality of directional antennas received the radio frequency signal, D(2) indicates whether or not a third directional antenna of the plurality of directional antennas received the radio frequency signal, D(3) indicates whether or not a fourth directional antenna of the plurality of directional antennas received the radio frequency signal, rssi(0) comprises a first signal strength of the radio frequency signal received by the first directional antenna, rssi(1) comprises a second signal strength of the radio frequency signal received by the second directional antenna, rssi(2) comprises a third signal strength of the radio frequency signal received by the third directional antenna, and rssi(3) comprises a fourth signal strength of the radio frequency signal received by the fourth directional antenna.

(2) an intermediate layer 8 used to perform numerical nonlinear mapping for the input data;

where in an embodiment, the intermediate layer may perform numerical nonlinear mapping by using a common activation function sigmoid function in the neural network and the like, where its specific form is not limited in the current embodiment.

(3) a sequence layer 9, containing two layers of neuron sequences;

where the longitudinally-connected neuron sequence is used to perform nonlinear mapping and the horizontally-connected neuron sequence is used to perform time accumulation updating. It should be noted that the data of the sequence layer will be updated rightward by one column when the data of the input layer is updated once.

(4) a fully-connected layer 10 and an output layer 11;

where an output sequence corresponding to the output layer may be [C(0), C(1), C(2), C(3), C(4), C(5), C(6), C(7)], respectively corresponding to movement probabilities of the current input layer data among four directional antennas.

Illustratively, C(0) represents a movement probability that the pedestrian moves from a region 1 covered by a directional antenna 1 to a region 2 covered by a directional antenna 2, C(1) represents the reverse direction of C(0), namely, a movement probability that the pedestrian moves from the region 2 covered by the directional antenna 2 to the region 1 covered by the directional antenna 1, and so on, C(2) represents a third movement probability that the pedestrian moves from the second region covered by the second directional antenna to a third region covered by the third directional antenna, C(3) represents a fourth movement probability that the pedestrian moves from the third region covered by the third directional antenna to the second region covered by the second directional antenna, C(4) represents a fifth movement probability that the pedestrian moves from the third region covered by the third directional antenna to a fourth region covered by the fourth directional antenna, C(5) represents a sixth movement probability that the pedestrian moves from the fourth region covered by the fourth directional antenna to the third region covered by the third directional antenna, C(6) represents a seventh movement probability that the pedestrian moves from the fourth region covered by the fourth directional antenna to the first region covered by the first directional antenna, and C(7) represents an eighth movement probability that the pedestrian moves from the first region covered by the first directional antenna to the fourth region covered by the fourth directional antenna.

The above embodiment realizes end-to-end calculation from tempo-spatial distribution to movement prediction for one passive label signal and avoids problematic scenarios such as infinite exhaustion due to environmental conditions. The edge computer may obtain a crowd distribution of a current position by only maintaining sequences L(0) to L(7) of 8 movement directions.

In an embodiment, the system further includes an application end applied to the calculation apparatus. The calculation apparatus is further configured to transmit regional crowd movement trend data obtained by calculation to the application end; the application end is configured to, based on the crowd movement trend data, and determine a movement region and a movement path associated to the movement region. The application end is further configured to obtain an electronic map, and based on position information of the movement region, determine a target display region in the electronic map. The application end is further configured to obtain an identifier display information corresponding to a road section in the movement path, and display the road section corresponding to the identifier display information on the target display region.

In the above embodiment, custom division is performed for the target display region on the electronic map and an in-region crowd movement path is displayed in the target display region, thus ensuring the display effect of the electronic map for the path and improving user experience.

In an embodiment, the application end is further configured to, based on the obtained crowd movement trend, determine a person flow density in each region, and when determining the person flow density of a corresponding region is greater than a preset density threshold, generate evacuation guidance information in combination with crowd distribution densities of other regions and surrounding environmental circumstance, and broadcast the evacuation guidance information.

In the above embodiment, a potential safety hazard present in the region may be identified in combination with the person flow density in the region, and safe evacuation guidance is quickly implemented in combination with the crowd distribution densities of other regions and the surrounding environmental circumstance, so as to improve evacuation efficiency and safety.

Figure 4:
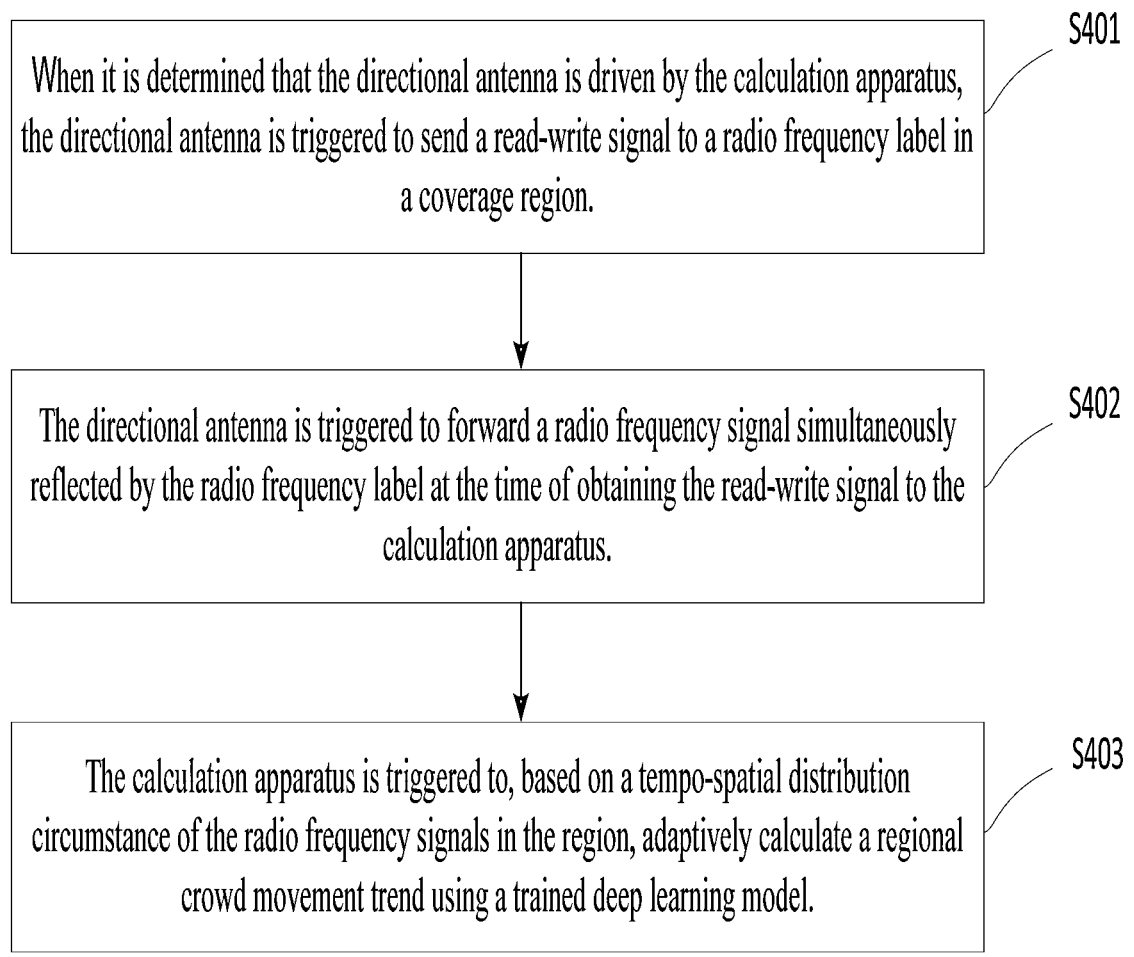
FIG. 4 is a flowchart illustrating a method of calculating a regional crowd movement according to an embodiment of the present disclosure.

FIG. 4 is a flowchart illustrating a method of calculating a regional crowd movement applied to the system according to any one of the above embodiments. The method includes the following steps.

At step S401, when it is determined that the directional antenna is driven by the calculation apparatus, the directional antenna is triggered to send a read-write signal to a radio frequency label in a coverage region.

At step S402, the directional antenna is triggered to forward a radio frequency signal simultaneously reflected by the radio frequency label at the time of obtaining the read-write signal to the calculation apparatus.

At step S403, the calculation apparatus is triggered to, based on a tempo-spatial distribution circumstance of the radio frequency signals in the region, adaptively calculate a regional crowd movement trend using a trained deep learning model.

In an embodiment, triggering the calculation apparatus to, based on the tempo-spatial distribution circumstance of the radio frequency signals in the region, adaptively calculate the regional crowd movement trend using the trained deep learning model includes: triggering the calculation apparatus to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information includes person flow rate information and label identification information; triggering the calculation apparatus to use the obtained radio frequency signal and a signal strength of the obtained radio frequency signal as first input data of the deep learning model and obtain a movement probability of movement of a pedestrian between different coverage regions by processing the first input data using the deep learning model; triggering the calculation apparatus to use the crowd flow information as second input data of the deep learning model, and based on the crowd flow information, perform deviation correction for the movement probability so as to determine the regional crowd movement trend based on the obtained correction result.

In an embodiment, the method further includes: triggering the calculation apparatus to transmit regional crowd movement trend data obtained by calculation to the application end; triggering the application end to, based on the crowd movement trend data, determine a movement region and a movement path associated in the movement region; triggering the application end to obtain an electronic map, and based on position information of the movement region, determine a target display region in the electronic map; triggering the application end to obtain an identifier display information corresponding to a road section comprised in the movement path, and display the road section corresponding to the identifier display information on the target display region.

In an embodiment, the method further includes: triggering the application end to, based on the obtained crowd movement trend, determine a person flow density in each region, and when determining the person flow density of a corresponding region is greater than a preset density threshold, generate evacuation guidance information in combination with crowd distribution densities of other regions and surrounding environmental circumstance, and broadcast the evacuation guidance information.

As can be known from the above, in the method of calculating a regional crowd movement in the present disclosure, the directional antenna reads the radio frequency labels such that a data volume accurately read in one second is not less than 200 PCS, thus improving data processing efficiency. In addition, without exposing user biological features and private information such as facial features, body pose, clothing, etc., based on the tempo-spatial distribution circumstance of the radio frequency signals in the region, the regional crowd movement trend may be adaptively calculated using a trained deep learning model, thereby avoiding problems such as infinite exhaustion due to environmental conditions. Thus, high efficiency, low resource consumption, and high recognition and estimation accuracy may be achieved simultaneously.

In the embodiments of the present disclosure, it should be understood that the disclosed apparatuses and methods may be implemented in another way. The apparatus embodiments described above are merely illustrative. For example, the division of the unit is only a logical functional division and another division may be performed in actual implementations. For another example, multiple units or assemblies may be combined or integrated into another system, or some features may be omitted or not implemented. Furthermore, mutual coupling or direct coupling or communication connection displayed or discussed may be indirect coupling or communication connection of apparatuses or units through some communication interfaces, and these connections may be electrical or mechanical connections or connections of another form.

Furthermore, the units described as separate members may be or not be physically separated, and the members displayed as units may be or not be physical units, i.e., may be located in one place, or may be distributed to a plurality of network units. Part or all of the units may be selected according to actual requirements to implement the objectives of the solutions in the embodiments.

Further, the functional modules in various embodiments of the present disclosure may be integrated together to form one independent part or exist separately, or two or more of the modules are integrated to form one independent part.

In the text, the relational terms such as first, and second are used only to distinguish one entity or operation from another entity or operation and do not necessarily require or imply that any such actual relation or sequence is present between these entities or operations.

The above descriptions are made only to the embodiments of the present disclosure and not to limit the scope of protection of the present disclosure. Those skilled in the art may make various changes or modifications to the present disclosure. Any changes, equivalent substitutions and improvements and the like made within the spirit and principle of the present disclosure shall fall within the scope of protection of the present disclosure.

What is claimed is:

1. A system for calculating a regional crowd movement applied to a target monitoring environment, comprising:
    a plurality of key travel nodes disposed within the target monitoring environment, radio frequency labels configured to be deployed on pedestrians, calculation apparatuses deployed at the key travel nodes, and
    a plurality of directional antennas, wherein
        the directional antenna is configured to, when driven by the calculation apparatus, send a read-write signal to the radio frequency label in a coverage region;
        the radio frequency label is configured to reflect a radio frequency signal upon obtaining the read-write signal to the directional antenna;
        the directional antenna is configured to forward the radio frequency signal to the calculation apparatus;
        the calculation apparatus is configured to, based on a tempo-spatial distribution circumstance of the radio frequency signals in the region, adaptively calculate a regional crowd movement trend using a trained deep learning model;
        the directional antenna is configured to read the radio frequency labels such that a count of the radio frequency labels accurately read in one second is greater than or equal to 200 pieces(PCS);
        the trained deep learning model comprises multiple layers of neural networks;
        the multiple layers comprise an input layer for obtaining the input data, an intermediate layer for performing nonlinear mapping for the input data, and a sequence layer for performing time accumulation updating and nonlinear mapping;
        the input layer comprises 8 neurons with a corresponding input sequence being [D(0), D(1), D(2), D(3), rssi(0), rssi(1), rssi(2), rssi(3)], where D(0) indicates whether or not a first directional antenna of the plurality of directional antennas received the radio frequency signal, D(1) indicates whether or not a second directional antenna of the plurality of directional antennas received the radio frequency signal, D(2) indicates whether or not a third directional antenna of the plurality of directional antennas received the radio frequency signal, D(3) indicates whether or not a fourth directional antenna of the plurality of directional antennas received the radio frequency signal, rssi(0) comprises a first signal strength of the radio frequency signal received by the first directional antenna, rssi(1) comprises a second signal strength of the radio frequency signal received by the second directional antenna, rssi(2) comprises a third signal strength of the radio frequency signal received by the third directional antenna, and rssi(3) comprises a fourth signal strength of the radio frequency signal received by the fourth directional antenna;
        the intermediate layer is configured to perform numerical nonlinear mapping using an activation sigmoid function;
        the sequence layer comprises two layers of neuron sequences;
        where a longitudinally-connected neuron sequence is used to perform the nonlinear mapping and a horizontally-connected neuron sequence is used to perform the time accumulation updating;
        data of the sequence layer is updated rightward by one column when data of the input layer is updated once;
        the multiple layers further comprise a fully-connected layer and an output layer;
        where an output sequence corresponding to the output layer comprises [C(0), C(1), C(2), C(3), C(4), C(5), C(6), C(7)], respectively corresponding to movement probabilities of current input layer data among the first directional antenna, the second directional antenna, the third directional antenna, and the fourth directional antenna; and
        C(0) represents a first movement probability that a pedestrian of the pedestrians moves from a first region covered by the first directional antenna to a second region covered by the second directional antenna, C(1) represents a second movement probability that the pedestrian moves from the second region covered by the second directional antenna to the first region covered by the first directional antenna, C(2) represents a third movement probability that the pedestrian moves from the second region covered by the second directional antenna to a third region covered by the third directional antenna, C(3) represents a fourth movement probability that the pedestrian moves from the third region covered by the third directional antenna to the second region covered by the second directional antenna, C(4) represents a fifth movement probability that the pedestrian moves from the third region covered by the third directional antenna to a fourth region covered by the fourth directional antenna, C(5) represents a sixth movement probability that the pedestrian moves from the fourth region covered by the fourth directional antenna to the third region covered by the third directional antenna, C(6) represents a seventh movement probability that the pedestrian moves from the fourth region covered by the fourth directional antenna to the first region covered by the first directional antenna, and C(7) represents an eighth movement probability that the pedestrian moves from the first region covered by the first directional antenna to the fourth region covered by the fourth directional antenna.

2. The system of claim 1, wherein the radio frequency label comprises an ISO18000-6C electronic label and consists of a circuit having a unique code, wherein;
the radio frequency label is further configured to, when obtaining the read-write signal transmitted by the directional antenna, reflect a radio frequency signal carrying circuit code information to the directional antenna such that the directional antenna forwards the radio frequency signal to the calculation apparatus.

3. The system of claim 1, wherein the directional antenna is connected to the calculation apparatus through a radio frequency cable, wherein;
the directional antenna comprises a plate antenna with a power of 30 dbm and the radio frequency cable comprises a standard cable of an impedance of 50 ohms;
a number of the directional antennas matches a number of channels covered at the key travel node, wherein each channel covered by the node is provided with a directional antenna facing in a direction parallel to the channel.

4. The system of claim 1, wherein the calculation apparatus is further configured to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information comprises person flow rate information and label identification information;
the calculation apparatus is further configured to use the obtained radio frequency signal and a signal strength of the obtained radio frequency signal as first input data of the deep learning model and obtain a movement probability of movement of a pedestrian between different coverage regions by processing the first input data using the deep learning model;
the calculation apparatus is further configured to use the crowd flow information as second input data of the deep learning model, and based on the crowd flow information, perform deviation correction for the movement probability so as to determine the regional crowd movement trend based on an obtained correction result.

5. The system of claim 1, wherein the deep learning model comprises a fully-connected layer and an output layer.

6. The system of claim 1, wherein the system further comprises an application end connected to the calculation apparatus;
the calculation apparatus is further configured to transmit regional crowd movement trend data obtained by calculation to the application end;
the application end is configured to, based on the crowd movement trend data, determine a movement region and a movement path associated in the movement region;
the application end is further configured to obtain an electronic map, and based on position information of the movement region, determine a target display region in the electronic map;
the application end is further configured to obtain an identifier display information corresponding to a road section comprised in the movement path, and display the road section corresponding to the identifier display information on the target display region.

7. The system of claim 1, wherein the application end is further configured to, based on the obtained crowd movement trend, determine a person flow density in each region, and when determining the person flow density of a corresponding region is greater than a preset density threshold, generate evacuation guidance information in combination with crowd distribution densities of other regions and surrounding environmental circumstance, and broadcast the evacuation guidance information.

8. A method of calculating a regional crowd movement applied to the system according to claim 1, comprising:
when determining the directional antenna is driven by the calculation apparatus, triggering the directional antenna to send a read-write signal to a radio frequency label in a coverage region;
triggering the directional antenna to forward a radio frequency signal simultaneously reflected by the radio frequency label at the time of obtaining the read-write signal to the calculation apparatus;
triggering the calculation apparatus to, based on a tempo-spatial distribution circumstance of the radio frequency signals in the region, adaptively calculate a regional crowd movement trend using a trained deep learning model.

9. The method of claim 8, wherein triggering the calculation apparatus to, based on the tempo-spatial distribution circumstance of the radio frequency signals in the region, adaptively calculate the regional crowd movement trend using the trained deep learning model comprises:
triggering the calculation apparatus to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information comprises person flow rate information and label identification information;
triggering the calculation apparatus to use the obtained radio frequency signal and a signal strength of the obtained radio frequency signal as first input data of the deep learning model and obtain a movement probability of movement of a pedestrian between different coverage regions by processing the first input data using the deep learning model;
triggering the calculation apparatus to use the crowd flow information as second input data of the deep learning model, and based on the crowd flow information, perform deviation correction for the movement probability so as to determine the regional crowd movement trend based on an obtained correction result.

10. The method of claim 8, wherein the radio frequency label comprises an ISO18000-6C electronic label and consists of a circuit having a unique code, wherein;
the radio frequency label is further configured to, when obtaining the read-write signal transmitted by the directional antenna, reflect a radio frequency signal carrying circuit code information to the directional antenna such that the directional antenna forwards the radio frequency signal to the calculation apparatus.

11. The method of claim 8, wherein the directional antenna is connected to the calculation apparatus through a radio frequency cable, wherein;
the directional antenna comprises a plate antenna with a power of 30 dbm and the radio frequency cable comprises a standard cable of an impedance of 50 ohms;
a number of the directional antennas matches a number of channels covered at the key travel node, wherein each channel covered by the node is provided with a directional antenna facing in a direction parallel to the channel.

12. The method of claim 8, wherein the calculation apparatus is further configured to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information comprises person flow rate information and label identification information;

the calculation apparatus is further configured to use the obtained radio frequency signal and a signal strength of the obtained radio frequency signal as first input data of the deep learning model and obtain a movement probability of movement of a pedestrian between different coverage regions by processing the first input data using the deep learning model;

the calculation apparatus is further configured to use the crowd flow information as second input data of the deep learning model, and based on the crowd flow information, perform deviation correction for the movement probability so as to determine the regional crowd movement trend based on an obtained correction result.

13. The method of claim 8, wherein the deep learning model comprises a fully-connected layer and an output layer.

14. The method of claim 8, wherein the system further comprises an application end connected to the calculation apparatus;

the calculation apparatus is further configured to transmit regional crowd movement trend data obtained by calculation to the application end;

the application end is configured to, based on the crowd movement trend data, determine a movement region and a movement path associated in the movement region;

the application end is further configured to obtain an electronic map, and based on position information of the movement region, determine a target display region in the electronic map;

the application end is further configured to obtain an identifier display information corresponding to a road section comprised in the movement path, and display the road section corresponding to the identifier display information on the target display region.

15. The method of claim 8, wherein the application end is further configured to, based on the obtained crowd movement trend, determine a person flow density in each region, and when determining the person flow density of a corresponding region is greater than a preset density threshold, generate evacuation guidance information in combination with crowd distribution densities of other regions and surrounding environmental circumstance, and broadcast the evacuation guidance information.

16. The method of claim 10, wherein triggering the calculation apparatus to, based on the tempo-spatial distribution circumstance of the radio frequency signals in the region, adaptively calculate the regional crowd movement trend using the trained deep learning model comprises:

triggering the calculation apparatus to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information comprises person flow rate information and label identification information;

triggering the calculation apparatus to use the obtained radio frequency signal and a signal strength of the obtained radio frequency signal as first input data of the deep learning model and obtain a movement probability of movement of a pedestrian between different coverage regions by processing the first input data using the deep learning model;

triggering the calculation apparatus to use the crowd flow information as second input data of the deep learning model, and based on the crowd flow information, perform deviation correction for the movement probability so as to determine the regional crowd movement trend based on an obtained correction result.

17. The method of claim 11, wherein triggering the calculation apparatus to, based on the tempo-spatial distribution circumstance of the radio frequency signals in the region, adaptively calculate the regional crowd movement trend using the trained deep learning model comprises:

triggering the calculation apparatus to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information comprises person flow rate information and label identification information;

triggering the calculation apparatus to use the obtained radio frequency signal and a signal strength of the obtained radio frequency signal as first input data of the deep learning model and obtain a movement probability of movement of a pedestrian between different coverage regions by processing the first input data using the deep learning model;

triggering the calculation apparatus to use the crowd flow information as second input data of the deep learning model, and based on the crowd flow information, perform deviation correction for the movement probability so as to determine the regional crowd movement trend based on an obtained correction result.

18. The method of claim 12, wherein triggering the calculation apparatus to, based on the tempo-spatial distribution circumstance of the radio frequency signals in the region, adaptively calculate the regional crowd movement trend using the trained deep learning model comprises:

triggering the calculation apparatus to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information comprises person flow rate information and label identification information;

triggering the calculation apparatus to use the obtained radio frequency signal and a signal strength of the obtained radio frequency signal as first input data of the deep learning model and obtain a movement probability of movement of a pedestrian between different coverage regions by processing the first input data using the deep learning model;

triggering the calculation apparatus to use the crowd flow information as second input data of the deep learning model, and based on the crowd flow information, perform deviation correction for the movement probability so as to determine the regional crowd movement trend based on an obtained correction result.

19. The method of claim 13, wherein triggering the calculation apparatus to, based on the tempo-spatial distribution circumstance of the radio frequency signals in the region, adaptively calculate the regional crowd movement trend using the trained deep learning model comprises:

triggering the calculation apparatus to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information comprises person flow rate information and label identification information;

triggering the calculation apparatus to use the obtained radio frequency signal and a signal strength of the obtained radio frequency signal as first input data of the deep learning model and obtain a movement probability of movement of a pedestrian between different coverage regions by processing the first input data using the deep learning model;

triggering the calculation apparatus to use the crowd flow information as second input data of the deep learning model, and based on the crowd flow information, perform deviation correction for the movement probability so as to determine the regional crowd movement trend based on an obtained correction result.

20. The method of claim 14, wherein triggering the calculation apparatus to, based on the tempo-spatial distribution circumstance of the radio frequency signals in the region, adaptively calculate the regional crowd movement trend using the trained deep learning model comprises:

triggering the calculation apparatus to obtain regional crowd movement data fed back by a first calculation apparatus of an adjacent node to which the calculation apparatus belongs, and based on the crowd movement data, determine crowd flow information covered in a node-connected channel in a preset time period, wherein the crowd flow information comprises person flow rate information and label identification information;

triggering the calculation apparatus to use the obtained radio frequency signal and a signal strength of the obtained radio frequency signal as first input data of the deep learning model and obtain a movement probability of movement of a pedestrian between different coverage regions by processing the first input data using the deep learning model;

triggering the calculation apparatus to use the crowd flow information as second input data of the deep learning model, and based on the crowd flow information, perform deviation correction for the movement probability so as to determine the regional crowd movement trend based on an obtained correction result.

* * * * *